(12) United States Patent
Kinoshita et al.

(10) Patent No.: US 7,671,787 B2
(45) Date of Patent: Mar. 2, 2010

(54) TARGET TRACKING APPARATUS AND METHOD

(75) Inventors: Ken Kinoshita, Tokyo (JP); Tadashi Nakamura, Tokyo (JP)

(73) Assignees: NEC Corporation, Tokyo (JP); Nippon Avionics Co., Ltd., Tokyo (JP)

(*) Notice: Subject to any disclaimer, the term of this patent is extended or adjusted under 35 U.S.C. 154(b) by 5 days.

(21) Appl. No.: 12/036,917

(22) Filed: Feb. 25, 2008

(65) Prior Publication Data

US 2008/0204305 A1    Aug. 28, 2008

(30) Foreign Application Priority Data

Feb. 26, 2007  (JP) .............................. 2007-045785

(51) Int. Cl.
*G01S 13/00* (2006.01)

(52) U.S. Cl. .............................. 342/61; 342/63; 244/3.1

(58) Field of Classification Search ............. 342/61–65; 244/3.1–3.2, 76 R, 183, 195

See application file for complete search history.

(56) References Cited

U.S. PATENT DOCUMENTS 7,394,046 B2 * 7/2008 Olsson et al. ................. 244/3.1

FOREIGN PATENT DOCUMENTS

| JP | 7-35850 A | 2/1995 |
|---|---|---|
| JP | 2000-241539 A | 9/2000 |
| JP | 2002-174681 A | 6/2002 |
| JP | 2003-130947 A | 5/2003 |

* cited by examiner

*Primary Examiner*—Thomas H Tarcza
*Assistant Examiner*—Timothy A Brainard
(74) *Attorney, Agent, or Firm*—Sughrue Mion, PLLC

(57) ABSTRACT

On adjusting a target specification data error predicted value so as to become larger on detecting maneuver of a target, the target specification data error predicted value is adjusted, in consideration of type of the maneuver and a course of the target, so as to make a direction of varying specification data large and to make a direction of constant specification data small. It is therefore possible to quickly recover a delay of the following of the varying specification data and to avoid increasing an error of the constant specification data.

18 Claims, 11 Drawing Sheets

1ST ELEMENT : $Y = A_{K-1}$

2ND ELEMENT : $Y = A + B$

3RD ELEMENT : $Y = A - B$

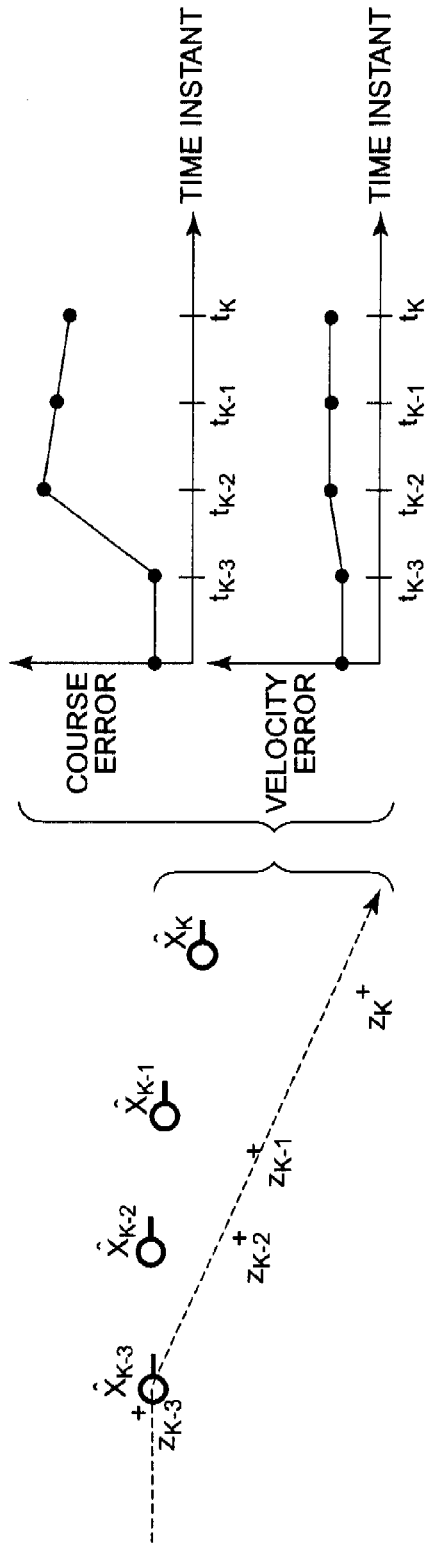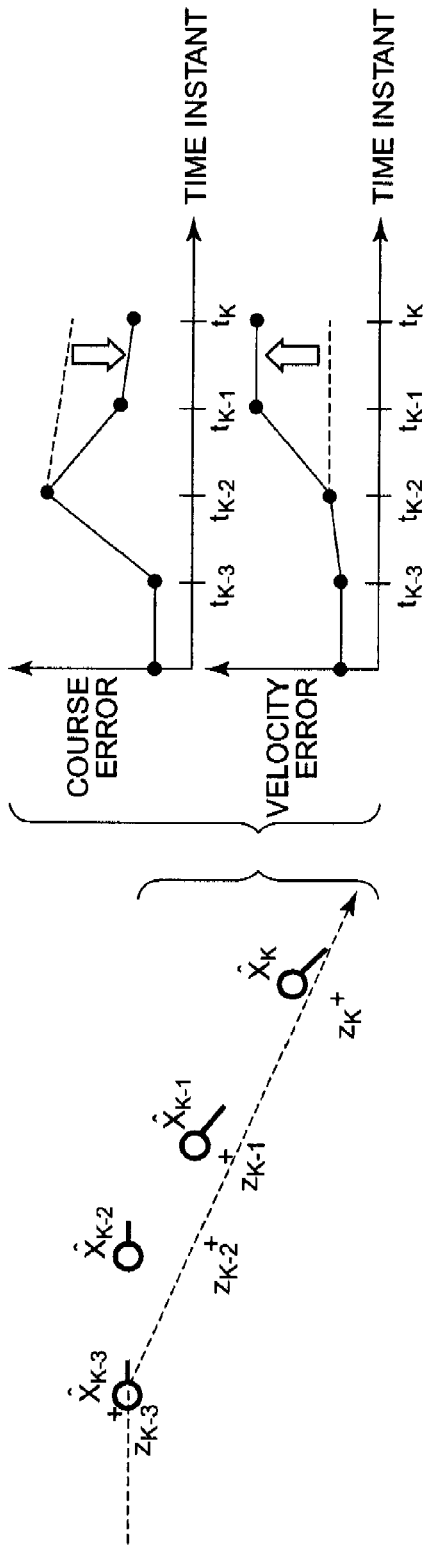

TARGET TRACKING APPARATUS AND METHOD

This application is based upon and claims the benefit of priority from Japanese patent application No. 2007-045785, filed on Feb. 26, 2007, the disclosure of which is incorporated herein in its entirety by reference.

BACKGROUND OF THE INVENTION

This invention relates to a target tracking method and a target tracking apparatus for estimating, from observed values obtained by observing a position of target such as an aircraft by a sensor such as a radar, specification data of the position and a speed of the target.

Various target tracking apparatuses are already proposed. By way of illustration, Japanese Unexamined Patent Application Publication of Tokkai No. 2000-241,539 or JP-A 2000-241539 (which will later be called a first patent document) discloses a "target tracking apparatus" which improve a tracking accuracy for a target with high mobile power by controlling an interval (sampling interval) for observing the target. The target tracking apparatus disclosed in the first patent document comprises an N motion models-based confidence calculating unit, an N motion models-based smoothing unit, an N motion models-based predictor, a motion model-by-motion model predictor, an N motion models-based smoothing error evaluator, a motion model-by-motion model prediction error evaluator, an N motion models-based prediction error evaluator, a gain matrix calculator, an observation time instant calculator, and a transition probability between motion models calculator.

The N motion models-based confidence calculator calculate an N motion models-based confidence based on motion position observed information, predicted values every motion model, prediction errors every motion model, and a confidence of each motion model before one sampling. The N motion models-based smoothing unit calculates an N motion models-based smoothed value based on the target position observed information, the N motion models-based confidence, a gain matrix, and an N motion models-based smoothed value before one sampling. The N motion models-based predictor calculates an N motion models-based predicted value based on the N motion models-based smoothed value, the N motion models-based confidence, and an observed time instant before one sampling. The motion model-by-motion model predictor calculates a motion model-by-motion model predicted value based on the N motion models-based smoothed value and the observation time instant before one sampling. The N motion models-based smoothing error evaluator calculates an N motion models-based smoothing error based on the N motion models-based confidence, the motion model-by-motion model predicted error, and the gain matrix. The motion model-by-motion model prediction error evaluator calculates a motion model-by-motion model prediction error based on the N motion models-based smoothing error and the observation time instant before one sampling. The N motion models-based prediction error evaluator calculates an N motion modules-based prediction error based on the motion model-by-motion model prediction error, the N motion models-based confidence, and the observed error before one sampling. The gain matrix calculator calculates a gain matrix based on the motion model-by-motion model prediction error. The observation time instant calculator calculates a time instant (observation time instant) when a next sampling (target observation) is carried out based on the N motion models-based confidence, the N motion models-based smoothed value, and the N motion models-based smoothed error. The transition probability between motion models calculator calculates a sampling interval between a current observation time instant and the next observation time instance based on the observation time instant produced by the observation time instant calculator to a transition probability between the motion models in the sampling interval.

At any rate, the first patent document discloses to calculate a target specification data predicted value and a target specification data error predicted value. In addition, the first patent document discloses to determine the sampling interval of observed information based on a target tracking accuracy.

In addition, Japanese Unexamined Patent Application Publication of Tokkai No. 2002-174681 or JP-A 2002-174681 (which will later be called a second patent document) discloses a "target tracking apparatus" capable of controlling a filter smoothing effect. The target tracking apparatus disclosed in FIG. 3 of the second patent document comprises a smoothing vector memory, a pseudo-smoothing error covariance matrix memory, a prediction vector calculating portion, a driving noise covariance setting portion, a pseudo-prediction error covariance matrix calculating portion, an observation noise covariance matrix setting portion, a pseudo-residual covariance matrix calculating portion, a gate decision portion, a gain matrix calculating portion, a smoothing vector calculating portion, a coefficient controlling portion, a coefficient multiplying portion, a pseudo-smoothing error covariance matrix calculating portion, a smoothing error covariance matrix memory, a prediction error covariance matrix calculating portion, a residual covariance matrix calculating portion, and a smoothing error covariance matrix calculating portion.

The smoothing vector memory stores a calculated result of a smoothing vector by the smoothing vector calculating portion. The smoothing error covariance matrix memory stores a calculated result of a smoothing error covariance matrix by the smoothing error covariance matrix calculating portion. The prediction vector calculating portion calculates a current prediction vector from a previous smoothing vector stored in the smoothing vector memory. The prediction error covariance matrix calculating portion calculates a current prediction error from the calculated result of a previous smoothing error covariance matrix stored in the smoothing error covariance matrix memory and a value of a driving noise covariance matrix set by the driving noise covariance matrix setting portion. The observation noise covariance matrix setting portion sets an observation noise covariance matrix based on parameters related to accuracy evaluation of an observation vector inputted from a target observation device. The residual covariance matrix calculating portion calculates a residual covariance matrix from the prediction error covariance matrix calculated by the prediction error covariance matrix calculating portion and the observation noise covariance matrix set by the observation noise covariance matrix setting portion. The gate decision portion calculates a residual vector based on the prediction error calculated by the prediction error calculating portion and the observation vector from the target observation device and carries out a gate decision whether or not the observation vector is detection data of a tracked target using the residual covariance matrix calculated by the residual covariance matrix calculating portion.

The pseudo-smoothing error covariance matrix memory stores a calculated result of a pseudo-smoothing error covariance matrix calculated by the pseudo-smoothing error covariance matrix calculating portion. The pseudo-prediction error covariance matrix calculating portion calculates a current pseudo-prediction error covariance matrix using a calculated result of a previous pseudo-smoothing error covariance matrix and a value of the driving noise covariance matrix set by the driving noise covariance matrix setting portion. The pseudo-residual covariance matrix calculating portion calculates a pseudo-residual covariance matrix using the pseudo-prediction error covariance matrix calculated by the pseudo-prediction error covariance matrix calculating portion and the observation noise covariance matrix set by the observation noise covariance matrix setting portion. The gain matrix calculating portion calculates a gain matrix for a filter using the pseudo-prediction error covariance matrix calculated by the pseudo-prediction error matrix calculating portion and the pseudo-residual error matrix calculated by the pseudo-residual error matrix calculating portion. The coefficient controlling portion determines a value of a scalar coefficient to be multiplexed to the observation noise covariance matrix according to a tracking state of the tracked target. The coefficient multiplying portion multiplies the observation noise covariance matrix by the above-mentioned scalar coefficient. The pseudo-smoothing error covariance matrix calculating portion calculates a pseudo-smoothing error covariance matrix using the observation noise covariance matrix multiplied by the above-mentioned scalar coefficient and the pseudo-prediction error covariance matrix calculated by the pseudo-prediction error covariance calculating portion.

At any rate, the second patent document discloses 1) to calculate the prediction vector (specification data) from the previous smoothing vector (specification data), 2) to calculate the prediction error covariance matrix from the previous error matrix, 3) to calculate the pseudo-prediction error covariance matrix (a new target specification data error predicted value) by multiplying the observation noise by the scalar coefficient based on mobility (straight-ahead, curve-ahead) of the target, 4) to calculate the gain from the pseudo-prediction error covariance matrix and do calculate the smoothing vector (estimated target) from the prediction vector and the gain, and 5) to calculate the smoothing error covariance matrix (a target specification data error estimated value) from the pseudo-prediction error covariance matrix, the observation noise, and the gain.

Japanese Unexamined Patent Application Publication of Tokkai No. 2003-130,947 or JP-A 2003-130947 (which will later be called a third patent document) discloses a "target tracking apparatus and method" which realizes a desired error elliptic body overlap degree by re-calculating a residual covariance matrix in the calculation of reliability when the motion of a target is judged to be incapable of being expressed in the model of a filter by the judgment of the overlap degree of an error elliptic body and enhances tracking capacity. In the third patent document, a predictor calculates a predicted value and a prediction error covariance matrix based on a smoothing value from a smoother, the reliability of respective motion models, a constant acceleration vector. In addition, the target tracking apparatus disclosed in the third patent document controls the error elliptic body in each axial direction to an arbitrary size to enhance tracking accuracy for a cornering target with an error reduced for a rectilinear motion target with constant velocity.

Japanese Unexamined Patent Application Publication of Tokkai No. Hei 7-35,850 or JP-A 7-35850 (which will later be called a fourth patent document) discloses a "target tracking apparatus" which ensures the processing time of computer, when a target is tracked at a short sampling interval, by calculating the predicted position and speed required for the tracking filter processing at next sampling time based on a smoothing position and speed calculated by means of a tacking filter. The fourth patent document discloses a smoothing value calculating device for calculating smoothing values of a position and a speed based on a filter gain constant and an observed value and a predicted value calculating device for calculating, from the above-mentioned smoothing values, predicted values of a position and a speed at a prediction time instant which is the next sampling time. In addition, the fourth patent document discloses a prediction vector calculating device for calculating a prediction vector at the next sampling time instant and a prediction error covariance calculating device for calculating a prediction error covariance matrix.

However, any of the first through the fourth patent documents neither discloses nor teaches maneuver detection time point prediction error adjusting units as disclosed in related target tracking apparatuses illustrated in FIGS. 5 and 7 in the manner which will later be described. In the manner which will become clear as the description proceeds, the related target tracking apparatuses are however disadvantageous in that a velocity error becomes large in accordance with a following of a delay of a course on detecting maneuver. In addition, the related target apparatuses are disadvantageous in that a course error becomes large in accordance with a following of a delay of a velocity on detecting maneuver.

SUMMARY OF THE INVENTION

It is an exemplary object of this invention to provide a target tracking apparatus which is capable of, on detecting maneuver, quickly recovering a delay of following of a course in a turning direction to maintain a velocity error small in a course direction when the maneuver is turning around with constant velocity.

It is an exemplary object of this invention to provide a target tracking apparatus which is capable of, on detecting maneuver, quickly recovering a delay of following of a velocity in a course direction to maintain a course error small in a turning direction when the maneuver is traveling in a straight line with acceleration/deceleration.

Other exemplary objects of this invention will become clear as the description proceeds.

According to a first exemplary aspect of this invention, a prediction error adjustment value calculating method is of calculating a prediction error adjustment value for adjusting a target specification data error predicted value on detecting that a target carries out a maneuver. The prediction error adjustment value calculating method includes the steps of deciding a type of the detected maneuver; and of forming the prediction error adjustment value so as to make a turning direction of the target large and to make a course direction of the target small when it is decided that the detected maneuver is turning around with constant velocity, and forming the prediction error adjustment value so as to make the course direction of the target large and to make the turning direction of the target small when it is decided that the detected maneuver is traveling in a straight line with acceleration/deceleration.

According to a second exemplary aspect of this invention, a prediction error adjusting method is of adjusting a target specification data error predicted value on detecting that a target carries out a maneuver. The prediction error adjusting method includes the steps of deciding a type of the detected maneuver, of forming the prediction error adjustment value so as to make a turning direction of the target large and to make a course direction of the target small when it is decided that the detected maneuver is turning around with constant velocity, and forming the prediction error adjustment value so as to make the course direction of the target large and to make the turning direction of the target small when it is decided that the detected maneuver is traveling in a straight line with acceleration/deceleration, and of adding the prediction error adjustment value to the target specification data error predicted value to calculate a renewed target specification data error predicted value.

According to a third exemplary aspect of this invention, a target tracking apparatus is supplied with an observed value of a target, an observed value error, and a time instant of the observed value and produces a current target specification data estimated value and a current target specification data error estimated value. The target tracking apparatus includes a prediction specification data calculating unit for calculating, in response to the time instant of the observed value and a previous target specification data estimated value, a current target specification data predicted value corresponding to the time instant of the observed value, a prediction specification data error calculating unit for calculating, in response to the time instant of the observed value and a previous target specification data error estimated value, a current target specification data error predicted value corresponding to the time instant of the observed value, a gain value calculating unit for calculating a gain value in response to the observed value error and the current specification data error predicted value, an estimation specification data calculating unit for calculating the current target specification data estimated value in response to the current target specification data predicted value, the observed value, and the gain value, an estimation specification data error calculating unit for calculating the current target specification data error estimated value in response to the current target specification data error predicted value, the observed value error, and the gain value, and a maneuver detection time point prediction error adjusting unit, disposed between the prediction specification data error calculating unit and the estimation specification data calculating unit and the gain value calculating unit, for operating at only a time point when it is detected that the target makes the maneuver. The maneuver detection time point prediction error adjusting unit calculates, in response to the current target specification data predicted value, a prediction error adjustment value obtained by rotating, on the basis of the current target specification data predicted value, a maneuver error in a course direction of a predicted speed included in the current target specification data predicted value. The maneuver detection time point prediction error adjusting unit supplies the estimation specification data error calculating unit and the gain value calculating unit with a renewed target specification data error predicted value obtained by adding the prediction error adjustment value to the current target specification data predicted value in lieu of the current target specification data error predicted value.

According to a fourth exemplary aspect of this invention, a target tracking method is for estimating, from an observed value which is obtained by observing a portion of a target, specification data of a position and a speed of the target. The target tracking method includes the steps of calculating, in response to a time instant of the observed value and a previous target specification data estimated value, a current target specification data predicted value corresponding to the time instant of the observed value, of calculating, in response to the time instant of the observed value and a previous target specification data error estimated value, a current target specification data error predicted value corresponding to the time instant of the observed value, of calculating a gain value in response to an observed value error and the current specification data error predicted value, of calculating a current target specification data estimated value in response to the current target specification data predicted value, the observed value, and the gain value, of calculating a current target specification data error estimated value in response to the current target specification data error predicted value, the observed value error, and the gain value, and of adjusting a prediction error at only a time point when it is detected that the target makes the maneuver. The adjusting step calculates, in response to the current target specification data predicted value, a prediction error adjustment value obtained by rotating, on the basis of the current target specification data predicted value, a maneuver error in a course direction of a predicted speed included in the current target specification data predicted value. The adjusting step produces a renewed target specification data error predicted value obtained by adding the prediction error adjustment value to the current target specification data predicted value.

BRIEF DESCRIPTION OF THE DRAWINGS

FIG. 8A shows an example of a tracking condition in turning around with constant velocity in the first related target tracking apparatus illustrated in FIG. 2;

FIG. 8B shows another example of a tracking condition in turning around with constant velocity in the second and the third related target tracking apparatuses illustrated in FIGS. 5 and 7;

FIG. 9A shows graphs of a course error and a velocity error in the first related target tracking apparatus;

FIG. 9B shows graphs of a course error and a velocity error in the second and the third related target tracking apparatuses;

DESCRIPTION OF THE EXEMPLARY EMBODIMENTS

Among mathematical expressions in description hereunder, a symbol T, which is attached to a shoulder of each vector and each matrix in the mathematical expressions of the vectors and the matrixes, represents a transpose of the vector and the matrix in question. Furthermore, in symbols used in the mathematical expressions and the specification, an element (a vector or a matrix) in which "~" is attached at the upper portion of the symbol represents a predicted value and an element (a vector or a matrix) in which "^" is attached at the upper portion of the symbol represents an estimated value.

Figure 1A:
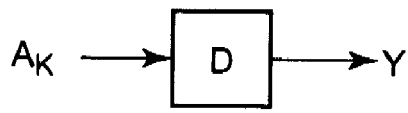
FIGS. 1A, 1B, and 1C show symbols of elements used in block diagrams.
Figure 1B:
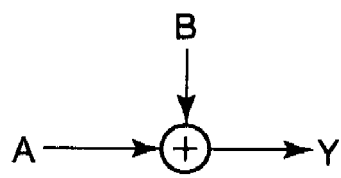
Figure 1C:
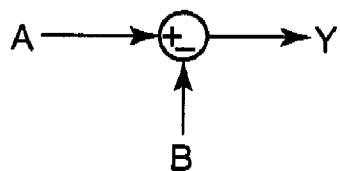

FIGS. 1A, 1B, and 1C show symbols of elements used in following block diagrams. A first element shown in FIG. 1A is a delay element for receiving $A_k$ at a time instant k to produce $A_{k-1}$ inputted before one time instant as a delayed result Y. A second element shown in FIG. 1B is an adder element for receiving A and B to produce (A+B) as an added result Y. A third element shown in FIG. 1C is a subtracter element for receiving A and B to produce (A−B) as a subtracted result Y.

Figure 2:
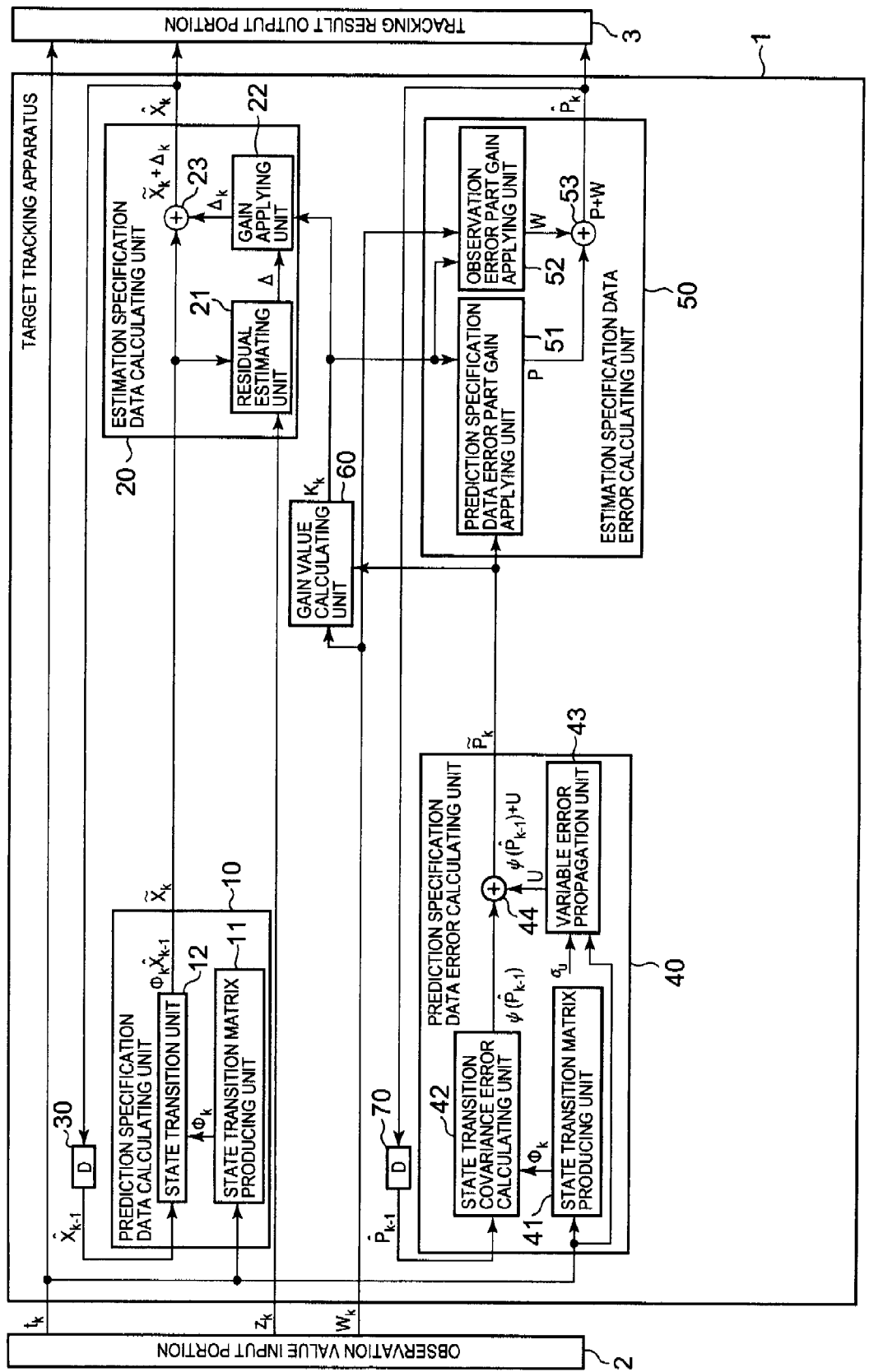
FIG. 2 is a block diagram of a first related target tracking apparatus.

Referring to FIG. 2, a first related target tracking apparatus 1 will be described at first in order to facilitate an understanding of the present invention. FIG. 2 is a block diagram of the first related target tracking apparatus 1.

Now, the description will be made as regards a connection relationship between the first related target tracking apparatus 1 and two external apparatuses and internal structure of the first related target tracking apparatus 1.

The first related target tracking apparatus 1 is connected to, as the two external apparatuses, an observation value input portion 2 and a tracking result output portion 3. The target tracking apparatus 1 comprises a prediction specification data calculating unit 10, an estimation specification data calculating unit 20, a first delay element 30, a prediction specification data error calculating unit 40, an estimation specification data error calculating unit 50, a gain value calculating unit 60, a second delay element 70.

Now, the description will proceed to input/output data between the first related target tracking apparatus 1 and the two external apparatuses and processing contents thereof.

The target tracking apparatus 1 is supplied from the observation value input portion 2 with, as observation result data, a time instant $t_k$, an observed value $z_k$, and an observed value error $W_k$ at a time point k, where k represents a natural number 1 to n and the time point k travels in the order of 1, 2, . . . . On the basis of their input values, the target tracking apparatus 1 calculates a target estimated specification data (a target specification data estimated value) $\hat{X}_k$ and a target estimated specification data error (a target specification data estimated error estimated value) $\hat{P}_k$ to deliver them to the tracking result output portion 3.

Herein, the time instant $t_k$ is, for example, an elapsed time interval elapsed from any time instant. The observed value $z_k$ is, for example, a vector having elements of a target position in an X-Y orthogonal coordinate system as an X coordinate value and a Y coordinate value which is represented by the following mathematical expression (1):

$$z_k = (xm_k, ym_k)^T \quad (1)$$

where $xm_k$ and $ym_k$ represent the X coordinate position and the Y coordinate position where the target is observed, respectively.

The observed value error $W_k$ is an error covariance matrix of the observed value $z_k$ that is defined by the following mathematical expression (2):

$$W_k = E[(z_k - HX_k)(z_k - HX_k)^T] \quad (2)$$

where $x_k$ is the following vector which represents a true value of the target specification data at the k time point:

$$X_k = (x_k, y_k, \dot{x}_k, \dot{y}_k)^T$$

where $x_k$ and $y_k$ are true values of the X coordinate position and the Y coordinate position of the target, respectively; and $\dot{x}_k$ and $\dot{y}_k$ are true values of an X coordinate speed and a Y coordinate speed of the target, where H represents the following matrix for extracting only the position vector from the target specification data vector by multiplying the matrix in question:

$$H = \begin{pmatrix} 1 & 0 & 0 & 0 \\ 0 & 1 & 0 & 0 \end{pmatrix}$$

The target estimated specification data $\hat{X}_k$ has, for example, elements of the X coordinate value, the Y coordinate value, the X coordinate speed value, the Y coordinate speed value which represent estimated values of the position and the speed of the target and is a vector represented by the following mathematical expression (3):

$$\hat{X}_k = (\hat{x}_k, \hat{y}_k, \hat{\dot{x}}_k, \hat{\dot{y}}_k)^T \quad (3)$$

where $\hat{x}_k$ and $\hat{y}_k$ are estimated values of the X coordinate position and the Y coordinate position of the target, respectively, and $\hat{\dot{x}}_k$ and $\hat{\dot{y}}_k$ are estimated values of the X coordinate speed and the Y coordinate speed of the target.

The target estimated specification data error $\hat{P}_k$ is an error covariance matrix of the target estimated specification data $\hat{X}_k$ that is defined by the following mathematical expression (4):

$$\hat{P}_k = E[(\hat{X}_k - X_k)(\hat{X}_k - X_k)^T] \quad (4)$$

Finally, the description will proceed to relationship of data between respective portions within the first related target tracking apparatus 1 and processing contents thereof.

The prediction specification data calculating unit 10 is supplied from the observation value input portion 2 with the time instant $t_k$ and is supplied from the estimation specification data calculating unit 20 with a previous target specification data estimated value $\hat{X}_{k-1}$ through the first delay element 30. The prediction specification data calculating unit 10 calculates a current target specification data predicted value $\tilde{X}_k$ at a time point (a current time point) corresponding to the input.

The prediction specification data calculating unit 10 comprises a state transition matrix producing unit 11 and a state transition unit 12. The state transition matrix producing unit 11 produces a state transition matrix $\Phi_k$ by the following mathematical expression (5) on the basis of the time instant $t_k$:

$$\Phi_k = \begin{pmatrix} 1 & 0 & \Delta t_k & 0 \\ 0 & 1 & 0 & \Delta t_k \\ 0 & 0 & 1 & 0 \\ 0 & 0 & 0 & 1 \end{pmatrix} \quad (5)$$

where $\Delta t_k$ represents a time difference between a (k−1) time point and a k time point by the following mathematical expression:

$$\Delta t_k = t_k - t_{k-1}$$

The state transition unit 12 calculates a current target specification data predicted value $\tilde{X}_k$ on the basis of a previous target specification data estimated value $\hat{X}_{k-1}$ and the state transition matrix $\Phi_k$ in accordance with the following mathematical expression (6):

$$\tilde{X}_k = \Phi_k \hat{X}_{k-1} \qquad (6)$$

In addition, the prediction specification data error calculating unit 40 is supplied from the observation value input portion 2 with the time instant $t_k$ and is supplied from the estimation specification data error calculating unit 50 with a previous target specification data error estimated value $\hat{P}_{k-1}$ through the second delay element 70. The prediction specification data error calculating unit 40 calculates and produces a current target specification data error predicted value $\tilde{P}_k$ at the time point (the current time point) corresponding to the input.

The prediction specification data error calculating unit 40 comprises a state transition matrix producing unit 41, a state transition covariance error calculating unit 42, a variable error propagation unit 43, an adder 44. The state transition matrix producing unit 41 produces the state transition matrix $\Phi_k$ in accordance with the above-mentioned mathematical expression (5) on the basis of the time instant $t_k$.

The state transition covariance error calculating unit 42 calculates, on the basis of a previous target specification data error estimated value $\hat{P}_{k-1}$ and the state transition matrix $\Phi_k$, a target specification data error estimated value $\phi(\hat{P}_{k-1})$ which corresponds to transition of the target specification data in accordance with the following mathematical expression (7):

$$\phi(\hat{P}_{k-1}) = \Phi_k \hat{P}_{k-1} \Phi_k^T \qquad (7)$$

The variable error propagation unit 43 calculates, on the basis of the time instant $t_k$ and a variable error assumption value $\sigma_u$, an incremental part U of the target specification data error caused by the variable error in accordance with the following mathematical expression (8):

$$U = \Gamma_1 \Gamma_1^T \sigma_u^2 \qquad (8)$$

where $$\Gamma_1 = \begin{pmatrix} \Delta t_k^2/2 & 0 \\ 0 & \Delta t_k^2/2 \\ \Delta t_k & 0 \\ 0 & \Delta t_k \end{pmatrix}$$

The adder 44 calculates a current target specification data error predicted value $\tilde{P}_k$ by adding the incremental part U of the target specification data error to the target specification data error estimated value $\phi(\hat{P}_{k-1})$ in accordance with the following mathematical expression (9).

$$\tilde{P}_k = \phi(\hat{P}_{k-1}) + U \qquad (9)$$

Herein, the target tracking apparatus 1 has structure where operation starts in a condition where an initial target specification data estimated value $\hat{X}_{k-1}$ and an initial target specification data error estimated value $\hat{P}_{k-1}$ are already calculated. That is, calculation of the initial target specification data estimated value $\hat{X}_{k-1}$ and the initial target specification data error estimated value $\hat{P}_{k-1}$ are made in outside of the target tracking apparatus 1 separately.

The gain value calculating unit 60 is supplied with the observed value error Wk and the target specification data error predicted value $\tilde{P}_k$ and calculates an applied rate or a gain value $K_k$ of the observed value $z_k$ on estimating the target estimated specification data by applying the observed value $z_k$ to the target specification data predicted value $\tilde{X}_k$. This calculation is carried by the following mathematical equation (10):

$$K_k = \tilde{P}_k H^T (H \tilde{P}_k H^T + W_k)^{-1} \qquad (10)$$

The estimation specification data calculating unit 20 is supplied with the current target specification data predicted value $\tilde{X}_k$, the current observed value $z_k$, and the current gain value $K_k$ and calculates a current target specification data estimated value $\hat{X}_k$ at a time point (the current time point) corresponding to the input to produce it.

The estimation specification data calculating unit 20 comprises a residual estimating unit 21, a gain applying unit 22, and an adder 23. The residual estimating unit 21 calculates, on the basis of the current target specification data predicted value $\tilde{X}_k$ and the observed value $z_k$, a residual $\Delta$ in accordance with the following mathematical expression (11):

$$\Delta = z_k - H \tilde{X}_k \qquad (11)$$

The gain applying unit 22 calculates, on the basis of the residual $\Delta$ and the gain value $K_k$, a part $\Delta_k$ obtained by applying the gain to the residual in accordance with the following mathematical expression (12):

$$\Delta_k = K_k \Delta \qquad (12)$$

The adder 23 adds the $\Delta k$ to the current target specification data predicted value $\tilde{X}_k$ in accordance with the following mathematical expression (13) to calculate the current target estimated specification data (target specification data estimated value) $\hat{X}_k$:

$$\hat{X}_k = \tilde{X}_k + \Delta_k \qquad (13)$$

The estimation specification data error calculating unit 50 is supplied with the current target specification data error predicted value $\tilde{P}_k$, the observed value error $W_k$, and the gain value $K_k$ and calculates a current target specification data error estimated value $\hat{P}_k$ at a time point (a current time point) corresponding to the input to produce it.

The estimation specification data error calculating unit 50 comprises a prediction specification data error part gain applying unit 51, an observation error part gain applying unit 52, and an adder 53. The prediction specification data error part gain applying unit 51 calculates, on the basis of the current target specification data error predicted value $\tilde{P}_k$ and the gain value $K_k$, a part P obtained by applying the gain to the prediction specification data error in accordance with the following mathematical expression (14):

$$P = (I - K_k H) \tilde{P}_k (I - K_k H)^T \qquad (14)$$

The observation error part gain applying unit 52 calculates, on the basis of the observed value error $W_k$ and the gain value $K_k$, a part W obtained by applying the gain to the observation error in accordance with the following mathematical expression (15):

$$W = K_k W_k K_k^T \qquad (15)$$

The adder 53 adds W to P in accordance with the following mathematical expression (16) to calculate the current target specification data error estimated value $\hat{P}_k$:

$$\hat{P}_k = P + W \quad (16)$$

The first related target tracking apparatus 1 illustrated in FIG. 2 is widely used as a target tracking apparatus of an aircraft which uses observation data detected by a sensor such as a radar and is applied not only to a target which travels in a straight line with constant velocity but alto to another target which turns around or makes acceleration/deceleration.

However, a characteristic of a tracking error changes in accordance with a set value of the variable error assumed value $\sigma_u$ which is used in the prediction specification data error calculating unit 40.

Figure 4A:
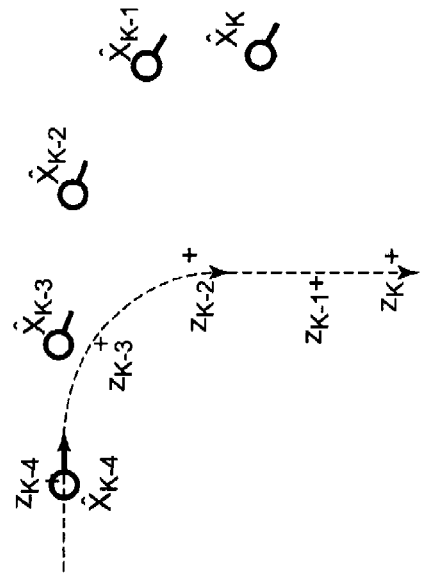
FIG. 4A shows a case where the variable error assumed value is small when the target turns around.
Figure 4B:
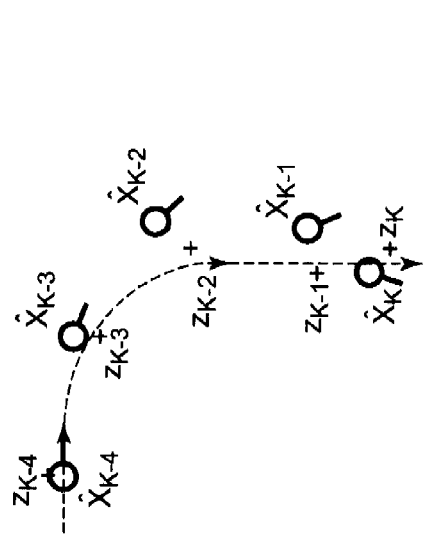
FIG. 4B shows another case where the variable error assumed value is large when the target turns around.
Figure 3A:
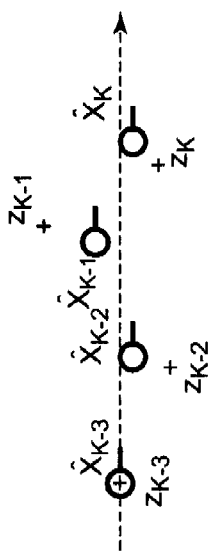
FIG. 3A shows a case where a variable error assumed value is small when a target travels in a straight line with constant velocity.
Figure 3B:
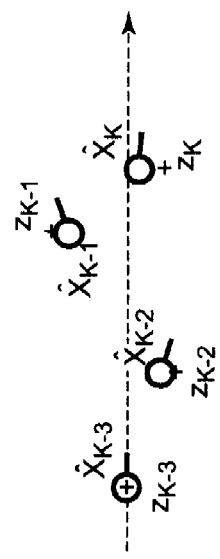
FIG. 3B shows another case where the variable error assumed value is large when the target travels in the straight line with constant velocity.

Referring to FIGS. 3A, 3B, 4A, and 4B, the description will be made as regards the state where the characteristic of the tracking error changes details. FIGS. 3A and 3B show cases where the target travels in the straight line with constant velocity. FIG. 3A shows a case where the variable error assumed value $\sigma_u$ is small while FIG. 3B shows another case where the variable error assumed value $\sigma_u$ is large. FIGS. 4A and 4B show cases where the target turns around. FIG. 4A shows a case where the variable error assumed value $\sigma_u$ is small while FIG. 4B shows another case where the variable error assumed value $\sigma_u$ is large. In each of FIGS. 3A, 3B, 4A, and 4B, an arrow of a broken lines represents a true flight path of the target, marks of cross represent observed values, marks of circle represent the target specification data estimated positions, and solid lines attached to the marks of circle represent directions of the target specification data estimated speeds.

It will be assumed that the target travels in the straight line with constant velocity. In this event, the smaller the variable error assumed value $\sigma_u$, the smaller the tracking error by preventing effects of the observation error included in the observed data of the sensor, as shown in FIG. 3A. On the other hand, it will be assumed that the target turns around. In this vent, the smaller the variable error assumed value $\sigma_u$, the larger following delays against maneuver, as shown in FIG. 4A.

It will be assumed that there is no particular demand as performance of the target tracking apparatus related to the tracking error for the target which travels in the straight line with constant velocity and to the following delays on maneuvering such as turning around. Under the circumstances, there is no inconvenience in structure the first related target tracking apparatus 1 illustrated in FIG. 2. On the other hand, when there is a particular demand related to them, it is necessary to search and set the variable error assumed value $\sigma_u$ so as to satisfy desired performances. However, in some cases, there is no variable error assumed value $\sigma_u$ which simultaneously satisfy those two desired performances. In this event, it is impossible to support by the target tracking apparatus 1 illustrated in FIG. 2.

Figure 5:
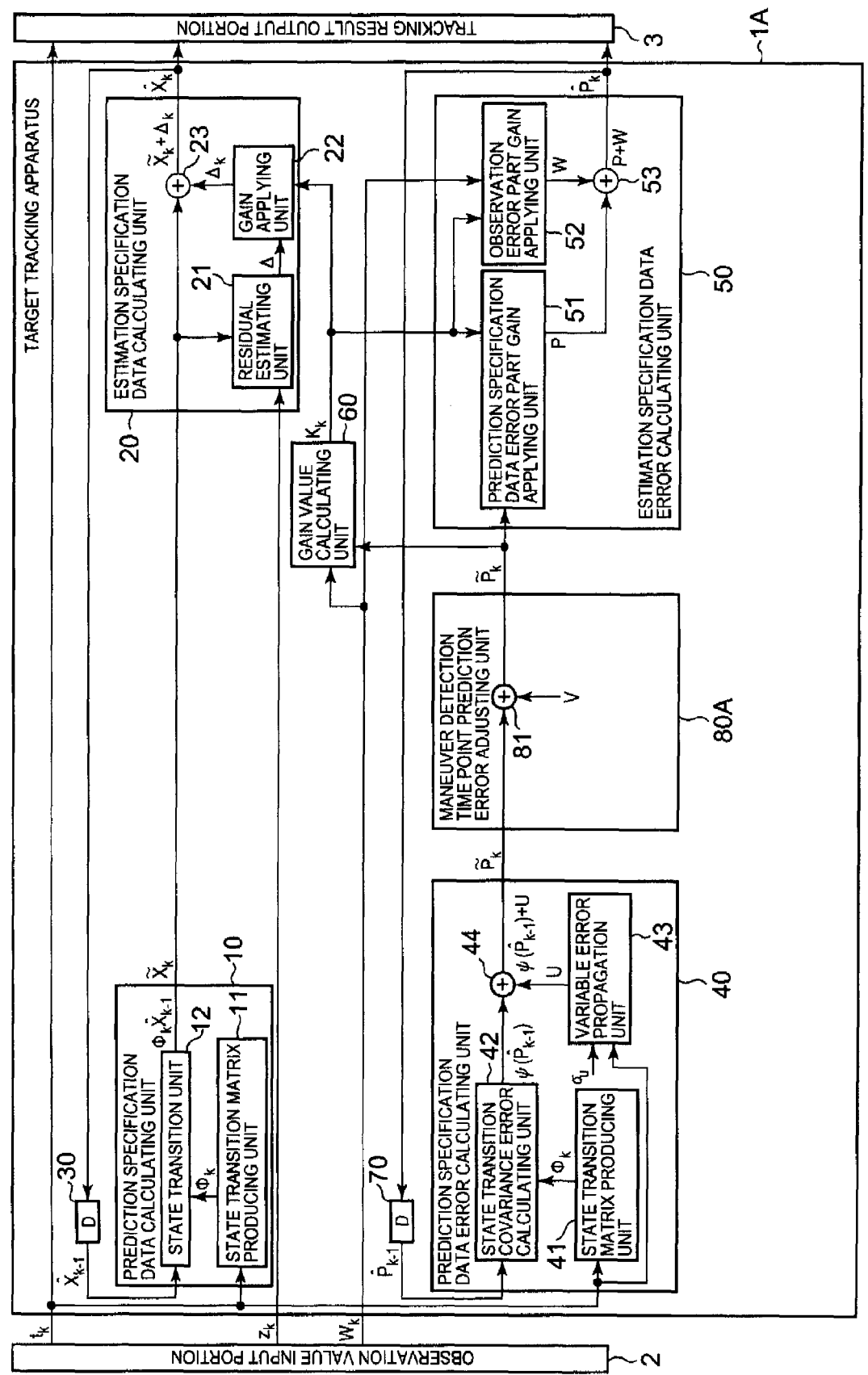
FIG. 5 is a block diagram of a second related target tracking apparatus.

FIG. 5 shows a second related target tracking apparatus 1A where some thought is put into the first related target tracking apparatus 1. The second related target tracking apparatus 1A is similar in structure to the first related target tracking apparatus 1 except that the second related target tracking apparatus 1A further comprises a maneuver detection time point prediction error adjusting unit 80A between the prediction specification data error calculating unit 40 and the estimation specification data error calculating unit 50.

The maneuver detection time point prediction error adjusting unit 80A operates one time only when it is detected that the target carries out maneuver such as turning around. The maneuver detection time point prediction error adjusting unit 80A comprises an adder 81. The adder 81 adds a predetermined prediction error adjustment value V to the current target specification data error predicted value $\tilde{P}_k$ calculated by the prediction specification data error calculating unit 40 to calculate a renewed target specification data error predicted value $\tilde{P}_k$ in accordance with the following mathematical expression (17):

$$\tilde{P}_k = \tilde{P}_k + V \quad (17)$$

Herein, a part for detecting that the target maneuvers is not included in the target tracking apparatus 1A illustrated in FIG. 5. Any different means except for the target tracking apparatus 1A detects that the target maneuvers.

Now, the description will be made as regards an effect of the second related target tracking apparatus 1A illustrated in FIG. 5. In the target tracking apparatus 1A, the current target specification data error predicted value $\tilde{P}_k$ becomes large by a part of the prediction error adjustment value V. Therefore, the gain value calculating unit 60 calculates a larger gain value $K_k$ in comparison with the first related target tracking apparatus 1 illustrated in FIG. 2. As a result, a larger gain is applied to the residual in the estimation specification data calculating unit 20 and the estimation specification data calculating unit 20 calculates the current target specification data estimated value $\hat{X}_k$ at a position near to the observed value $z_k$ in comparison with the first related target tracking apparatus 1 illustrated in FIG. 2. Accordingly, the second related target tracking apparatus 1A is advantageous in that it is possible to make the following delays smaller.

Figure 6A:
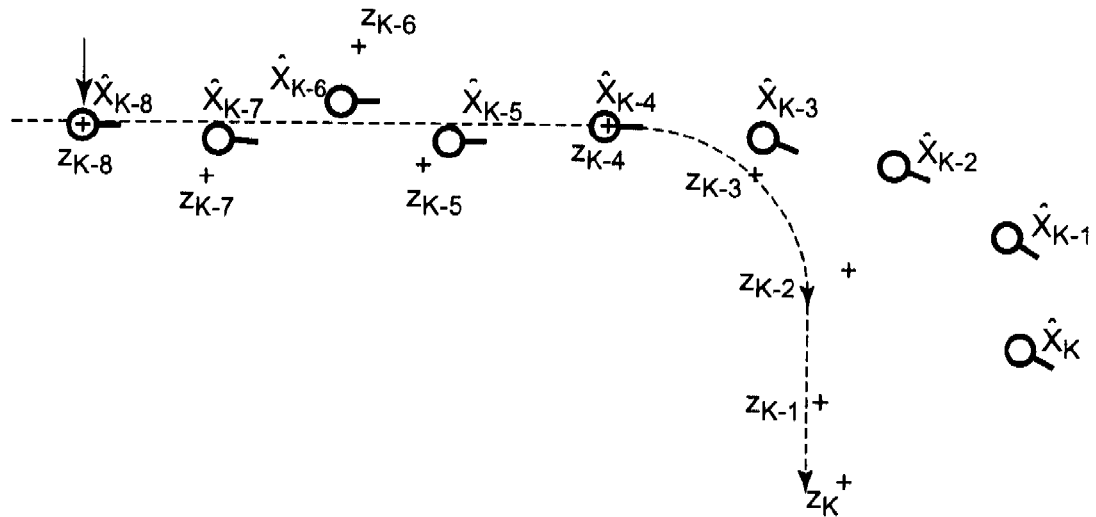
FIG. 6A shows an example of a tracking situation by the first related target tracking apparatus illustrated in FIG. 2 when the variable error assumed value is small.
Figure 6B:
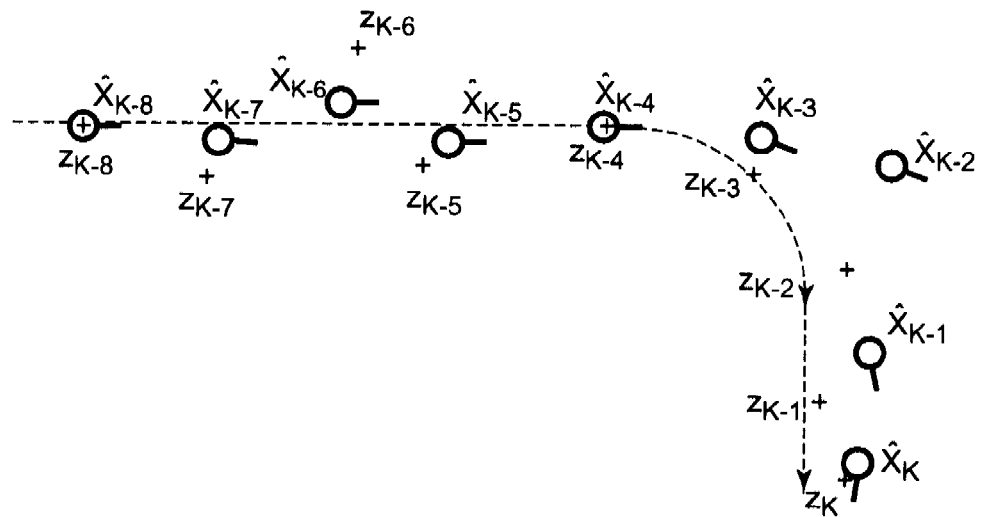
FIG. 6B shows an example of a tracking situation by the second related target tracking apparatus illustrated in FIG. 5 when the variable error assumed value is small.

FIGS. 6A and 6B show the state of the effect. FIG. 6A shows an example of a tracking situation by the first related target tracking apparatus 1 illustrated in FIG. 2 when the variable error assumed value $\sigma_u$ is small. FIG. 6B shows an example of a tracking situation by the second related target tracking apparatus 1A illustrated in FIG. 5 when the variable error assumed value $\sigma_u$ is small. From FIG. 6B, it is understood that the following delay is small when the maneuver is detected at a time instant $t_{k-1}$ in comparison with FIG. 6A.

Herein, the prediction error adjustment value V is an error covariance matrix which makes the prediction specification data error increase. It is necessary for elements of the error covariance matrix to satisfy a condition of values as the error covariance matrix which is indicated by the following mathematical equation (18):

$$V = \begin{pmatrix} \Delta\sigma_p^2 & 0 & \Delta\sigma_{pv} & 0 \\ 0 & \Delta\sigma_p^2 & 0 & \Delta\sigma_{pv} \\ \Delta\sigma_{pv} & 0 & \Delta\sigma_v^2 & 0 \\ 0 & \Delta\sigma_{pv} & 0 & \Delta\sigma_v^2 \end{pmatrix} \quad (18)$$

where $\Delta\sigma_P > 0$, $\Delta\sigma_V > 0$, and $\Delta\sigma_{PV} > 0$.

Although the prediction error adjustment value V is preliminarily set in the target tracking apparatus 1A illustrated in FIG. 5, the maneuver detection time point prediction error adjusting unit may be constructed so as to produce the prediction error adjustment value V in a dynamic fashion.

Figure 7:
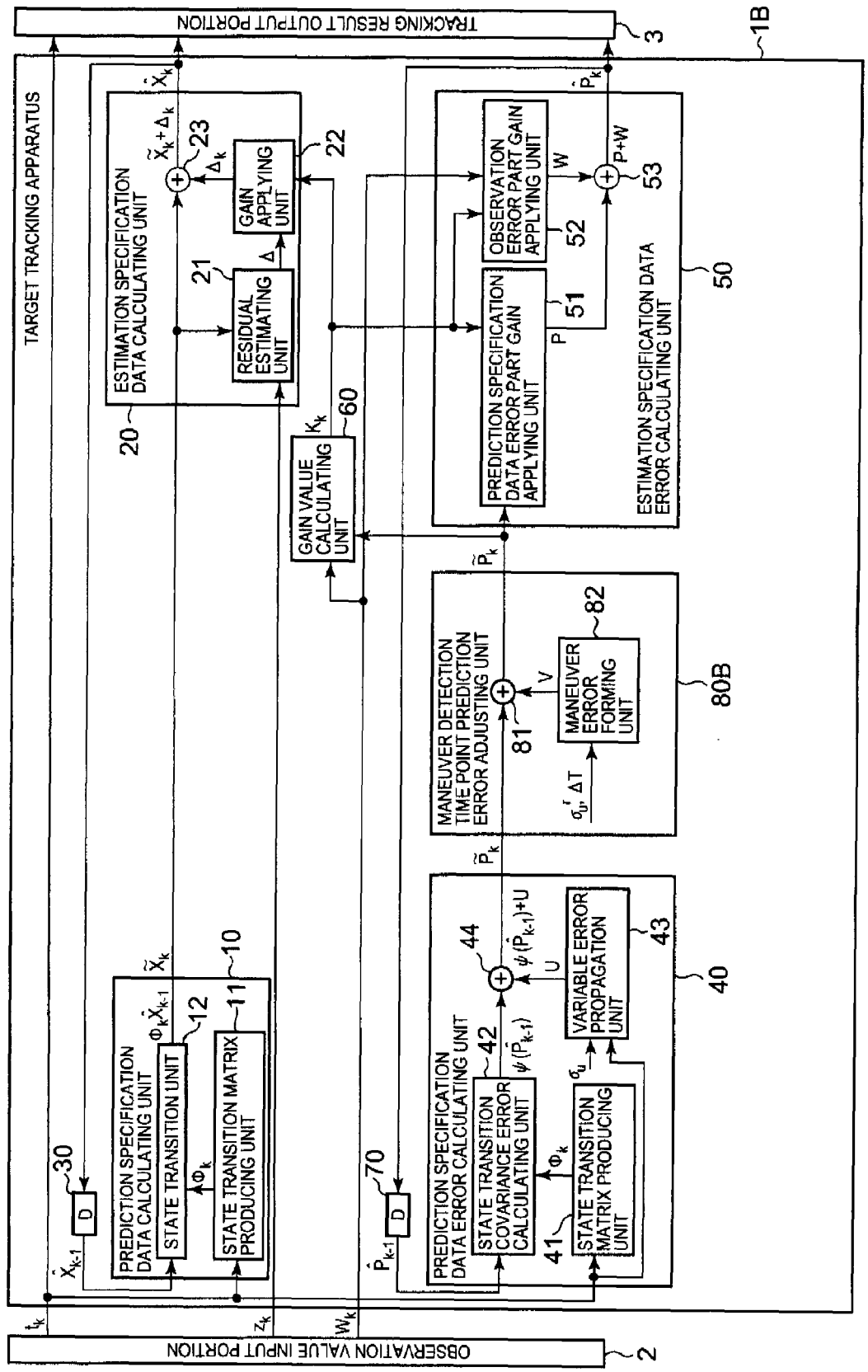
FIG. 7 is a block diagram of a third related target tracking apparatus.

FIG. 7 shows a third related target tracking apparatus 1B which is constructed in such a manner. That is, the target tracking apparatus 1B is similar in structure to the second related target tracking apparatus 1A illustrated in FIG. 5 except that the maneuver detection time point prediction error adjusting unit is modified from that illustrated in FIG. 5 as will later become clear. The maneuver detection time point prediction error adjusting unit is therefore depicted at 80B.

The maneuver detection time point prediction error adjusting unit 80B comprises the adder 81 and a maneuver error forming unit 82. The maneuver error forming unit 82 is supplied with a predetermined maneuver error assumed value $\sigma''_u$ and a maneuver detection time maneuver error propagation time interval $\Delta T$ and calculates the prediction error adjustment value V in accordance with the following mathematical expression (19):

$$V = \Gamma_1 \Gamma_1^T \sigma_u'^2 \tag{19}$$

where $$\Gamma_1 = \begin{pmatrix} \Delta T^2/2 & 0 \\ 0 & \Delta T^2/2 \\ \Delta T & 0 \\ 0 & \Delta T \end{pmatrix}$$

The target tracking apparatus 1B having such a structure can obtain an effect similar to that of the target tracking apparatus 1A illustrated in FIG. 5.

Incidentally, the second and the third related target tracking apparatuses 1A and 1B illustrated in FIGS. 5 and 7 can make the tracking error for the target traveling in the straight line with constant velocity maintain small and can make the following delay on maneuvering such as turning around with constant velocity in comparison with the first related target tracking apparatus 1 illustrated in FIG. 2.

Now, the description will proceed to problems in the second and the third related target tracking apparatuses 1A and 1B illustrated in FIGS. 5 and 7.

FIGS. 8A, 8B, 9A, and 9B, the description will be made as regards characteristics of speed errors on detecting maneuver in a tracking condition of turning around with constant velocity. FIG. 8A shows an example of a tracking condition in turning around with constant velocity in the first related target tracking apparatus 1 (FIG. 2). FIG. 8B shows another example of a tracking condition in turning around with constant velocity in the second and the third related target tracking apparatuses 1A and 1B (FIGS. 5 and 7). FIG. 9A shows graphs of a course error and a velocity error in the first related target tracking apparatus 1. FIG. 9B shows graphs of a course error and a velocity error in the second and the third related target tracking apparatuses 1A and 1B.

The maneuver of turning around with constant velocity is a maneuver where a velocity (an absolute value of a speed) is constant and a course (a direction of the speed) changes. On detecting the maneuver of turning around with constant velocity, in the speed of the estimation target specification data, it is put into a condition where the velocity has a small error and only the course has the following delay. Therefore, the second and the third related target tracking apparatuses 1A and 1B illustrated in FIGS. 5 and 7 are disadvantageous in that the velocity error becomes large with the following of the course error on detecting the maneuver, as shown in FIG. 9B.

A maneuver of traveling in the straight line with acceleration/deceleration is a maneuver where the course (the direction of the speed) is constant and the velocity (the absolute value of the speed) changes. On detecting the maneuver of traveling in the straight line with acceleration/deceleration, in the speed of the estimation target specification data, it is put into a condition where the course has a small error and the only the velocity has the following error. Therefore, the second and the third related target tracking apparatuses 1A and 1B illustrated in FIGS. 5 and 7 are disadvantageous in that the course error becomes large with the following of the velocity error on detecting the maneuver.

Now, the description will proceed to a point of view up to reach this invention. In other words, the consideration will be made as regards a cause of the above-mentioned problems in the second and the third related target tracking apparatuses 1A and 1B illustrated in FIGS. 5 and 7.

The reason why the second and the third related target tracking apparatuses 1A and 1B illustrated in FIGS. 5 and 7 can make the following delay small on detecting maneuver in comparison with the first related target tracking apparatus 1 illustrated in FIG. 1 is that calculation in the gain value calculating unit 60 and the estimation specification data calculating unit 20 uses to be determined by a relationship between the current target specification data error predicted value $\tilde{P}_k$ and the observed error value $W_k$.

Figure 10A:
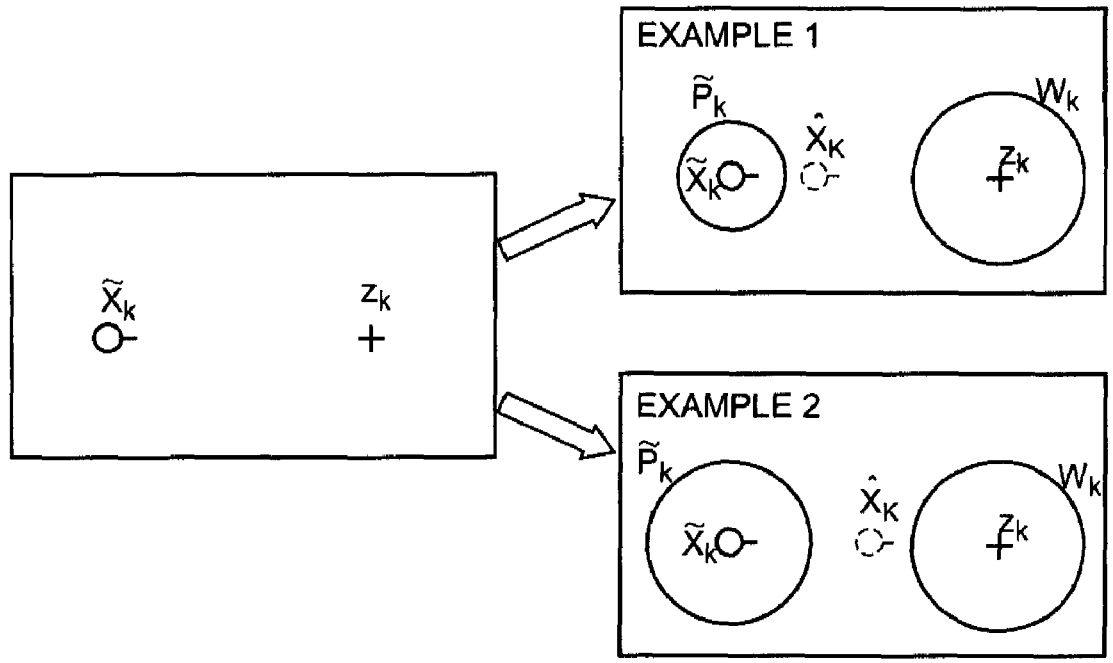
FIGS. 10A and 10B show sizes of the current target specification data error predicted value and the observation error value as sizes of a range on the figure.
Figure 10B:
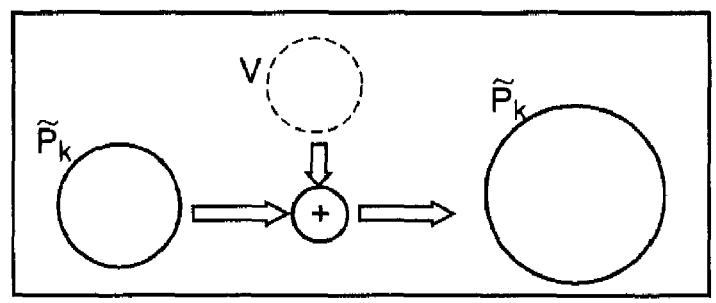

Referring to FIGS. 10A and 10B, the description will proceed to this reason. FIGS. 10A and 10B show sizes of the current target specification data error predicted value $\tilde{P}_k$ and the observed error value $W_k$ as sizes of a range on the figure. Specifically, when the current target specification data error predicted value $\tilde{P}_k$ is larger than the observed error value $W_k$ as an example 2 of FIG. 10A, the current target specification data estimated value $\hat{X}_k$ is calculated regarding the observed value $z_k$ as important. Conversely, when the current target specification data error predicted value $\tilde{P}_k$ is smaller than the observed error value Wk as an example 1 of FIG. 10A, the current target specification data estimated value $\hat{X}_k$ is calculated regarding the current target specification data predicted value $\hat{X}_k$ as important.

Illustrated in FIGS. 10A and 10B, a range of the error generally becomes an ellipse and a size of the error is determined the values of the elements of the current target specification data error predicted value $\tilde{P}_k$ and the observed error value $W_k$. For instant, it will be assumed that a first row and a first column element, a first row and a second column element, a second row and a first column element, and a second row and a second column element are represented by $\sigma_{11}$, $\sigma_{12}$, $\sigma_{21}$, and $\sigma_{22}$, respectively. In this event, a ratio between the size of the range in the X direction and the size of the range in the Y direction on the X-Y orthogonal coordinate is $\sqrt{\sigma_{11}}$: $\sqrt{\sigma_{22}}$ and an inclination of the ellipse is determined by a relationship of the respective elements including $\sigma_{12}$.

Accordingly, inasmuch as the second and the third related target tracking apparatuses 1A and 1B illustrated in FIGS. 5 and 7 make the current target specification data error predicted value $\tilde{P}_k$ large by the prediction error adjustment value V by the maneuver detection time point prediction error adjusting units 80A and 80B, it is possible to make the following delay small by calculating the current target specification data estimated value $\hat{X}_k$ regarding the observed value $z_k$ by a part of the prediction error adjustment value V. As shown in FIG. 10B, a shape of a range corresponding to the prediction error adjustment value V which the maneuver detection time point prediction error adjusting unit 80A and 80B of the second and the third related target tracking apparatuses 1A and 1B form is circle. That is, the prediction error adjustment value V is isotropic irrespective of the course of the target.

Thus, according to this invention, in order to resolve the above-mentioned problems, isotropy of the prediction error adjustment value V is renewed in the manner which will later be described.

More specifically, it will be assumed that the maneuver is turning around with constant velocity on detecting the maneuver of the target. In this event, a prediction error adjustment value is formed so that the prediction error adjustment value becomes large in a turning direction of the target which is a direction in which the target maneuvers or in a direction orthogonal to the course and becomes small in a course direction of the target. Therefore, it is possible to quickly recover a delay of the following of the course in the turning direction of the target and to maintain the velocity error small in the course direction of the target. On the other hand, it will be assumed that the maneuver is traveling in a straight line with acceleration/deceleration on detecting the maneuver of the target. In this event, a prediction error adjustment value is formed so that the prediction error adjustment value becomes large in the course direction of the target which is a direction in which the target maneuvers and becomes small in the turning direction of the target. Therefore, it is possible to quickly recover a delay of the following of the velocity in the course direction of the target and to maintain the course error small in the turning direction of the target.

Figure 11:
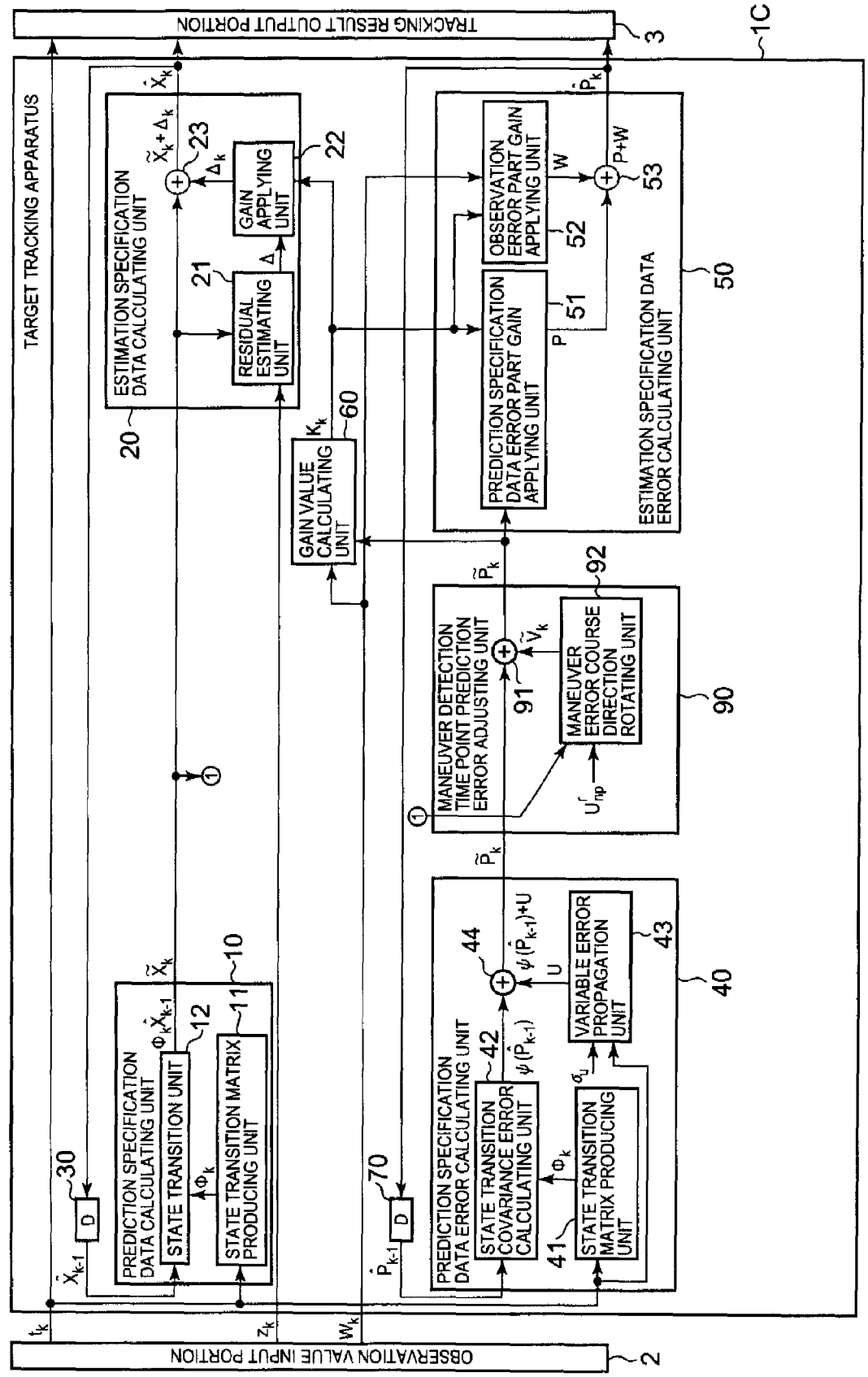
FIG. 11 is a block diagram of a target tracking apparatus according to a first embodiment of this invention.

Referring to FIG. 11, the description will proceed to a target tracking apparatus 1C according to a first embodiment of this invention. The illustrated target tracking apparatus 1C is similar in structure to the target tracking apparatuses 1A and 1B illustrated in FIGS. 5 and 7 except that structure of the maneuver detection time point prediction error adjusting unit is different from those illustrated in FIGS. 5 and 7 as will later become clear. The maneuver detection time point prediction error adjusting unit is therefore depicted at 90. Those having functions similar to those illustrated in FIGS. 5 and 7 are attached to the same reference symbols and description thereof is omitted for the sake of simplification of description.

When it is detected that the target carries out maneuver such as turning around, the maneuver detection time point prediction error adjusting unit 90 carries out operation one time. The maneuver detection time point prediction error adjusting unit 90 comprises an adder 91 and a maneuver error course direction rotating unit 92. The maneuver error course direction rotating unit 92 is supplied with a predetermined maneuver error $U^r_{np}$ and the current target specification data predicted value $\tilde{X}_k$. The maneuver error course direction rotating unit 92 calculates a prediction error adjustment value $\tilde{V}_k$ obtained by rotating the maneuver error $U^r_{np}$ so as to adjust a vertical direction of an error range indicated by the maneuver error $U^r_{np}$ to a course direction of the current target specification data predicted value $\tilde{X}_k$ in accordance with the following mathematical expression (20):

$$\tilde{v}_k = \Gamma_\theta u_{np}{}^r \Gamma_\theta{}^T \qquad (20)$$

where $$\Gamma_\theta = \begin{pmatrix} \cos\theta_v & \sin\theta_v & 0 & 0 \\ -\sin\theta_v & \cos\theta_v & 0 & 0 \\ 0 & 0 & \cos\theta_v & \sin\theta_v \\ 0 & 0 & -\sin\theta_v & \cos\theta_v \end{pmatrix}$$

Herein, $$\theta_v = \tan^{-1}\left(\frac{\tilde{\dot{x}}_k}{\tilde{\dot{y}}_k}\right):$$

a course of the target, where $$(\tilde{x}_k \tilde{\dot{x}}_k \tilde{y}_k \tilde{\dot{y}}_k)^T = \tilde{X}_k$$

The adder 91 adds the prediction error adjustment value $\tilde{V}_k$ to the current target specification data error predicted value $\tilde{P}_k$ calculated by the prediction error specification data error calculating unit 40 to calculate a renewed target specification data error predicted value $\tilde{P}_k$ in accordance with the following mathematical expression (21):

$$\tilde{P}_k = \tilde{P}_k + \tilde{V}_k \qquad (21)$$

In addition, a part for detecting that the target makes maneuver is especially not included in the target tracking unit 1C, that target makes the maneuver is detected by any different means except for the target tracking unit 1C. In addition, the maneuver error $U^r_{np}$ is an error covariance matrix for making the prediction specification data error increase. The error covariance matrix has elements which satisfy a condition of values as the error covariance matrix in accordance with the following mathematical expression (22):

$$U^r_{np} = \begin{pmatrix} U_{11} & 0 & U_{13} & 0 \\ 0 & U_{22} & 0 & U_{24} \\ U_{31} & 0 & U_{33} & 0 \\ 0 & U_{42} & 0 & U_{44} \end{pmatrix} \qquad (22)$$

where respective elements except for zero are positive values.

In addition, it is suitable that the maneuver error $U^r_{np}$ further satisfies the following relationship in accordance with a type of the maneuver. It will be assumed that the maneuver is turning around with constant velocity. In this event, the maneuver error $U^r_{np}$ satisfies $U_{11} > U_{22}$, $U_{33} > U_{44}$, $U_{12} > U_{24}$, and $U_{31} > U_{42}$. It will be assumed that the maneuver is traveling in the straight line with acceleration/deceleration. In this event, the maneuver error $U^r_{np}$ satisfies $U_{11} < U_{22}$, $U_{33} < U_{44}$, $U_{12} < U_{24}$, and $U_{31} < U_{42}$.

In addition, although the maneuver error $U^r_{np}$ is preliminarily set in the target tracking apparatus 1C illustrated in FIG. 11, the maneuver detection time point prediction error adjusting unit may be constructed so as to form the maneuver error in a dynamic fashion.

Figure 12:
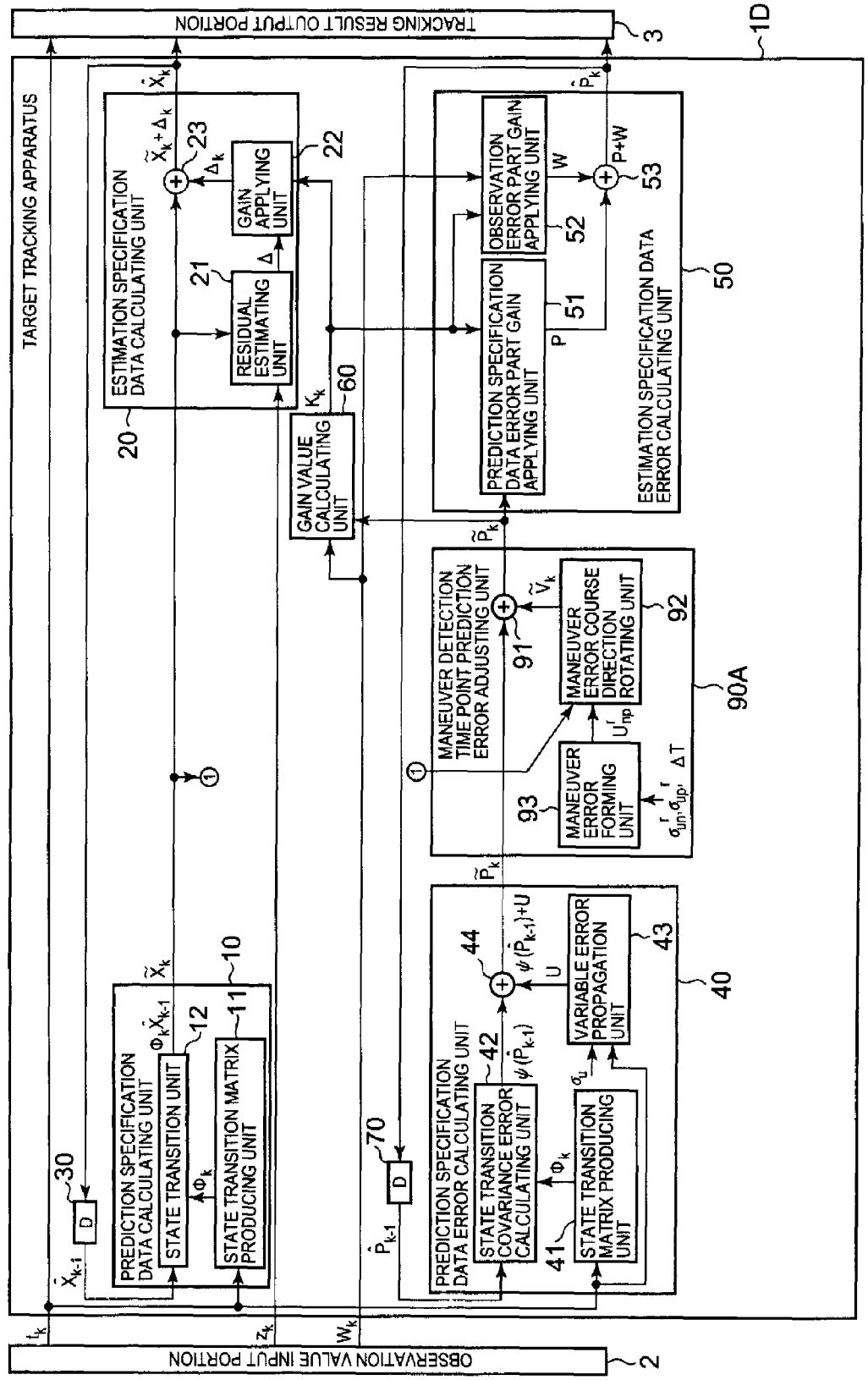
FIG. 12 is a block diagram of a target tracking apparatus according to a second embodiment of this invention.

FIG. 12 is a block diagram of a target tracking apparatus 1D according to a second embodiment of this invention that is constructed in such a manner. The maneuver detection time point prediction error adjusting unit is depicted at 90A.

The maneuver detection time point prediction error adjusting unit 90A comprises a maneuver error forming unit 93 as well as the adder 91 and the maneuver error course direction rotating unit 92. The maneuver error forming unit 93 is supplied with a predetermined maneuver error turning direction assumed value $\sigma^r_{un}$, a predetermined maneuver error course direction assumed value $\sigma^r_{up}$, and a maneuver detection time maneuver error propagation time interval $\Delta T$. The maneuver error forming unit 93 calculates a maneuver error $U^r_{np}$ in accordance with the following mathematical expression (23):

$$U_{np}^r = r_1 \begin{pmatrix} \sigma_{un}^2 & 0 \\ 0 & \sigma_{up}^2 \end{pmatrix} \Gamma_1^T \qquad (23)$$

where $$\Gamma_1 = \begin{pmatrix} \Delta T^2/2 & 0 \\ 0 & \Delta T^2/2 \\ \Delta T & 0 \\ 0 & \Delta T \end{pmatrix}$$

The target tracking apparatus 1D having such a structure can save some work for heeding to satisfy a condition of the elements described above on preliminarily preparing the values of the maneuver error $U^r{}_{np}$ in the target tracking apparatus 1C illustrated in FIG. 11. In addition, the target tracking apparatus 1D can obtain effect similar to that of the target tracking apparatus 1C illustrated in FIG. 11.

Although the maneuver error $U^r{}_{np}$ is rotated on the basis of the course of the target after calculating the maneuver error $U^r{}_{np}$ in the target tracking apparatus 1D illustrated in FIG. 12, it is possible to calculate the prediction error adjustment value $\tilde{V}_k$ similar to that in the maneuver detection time point prediction error adjusting unit 90A of the target tracking apparatus 1D illustrated in FIG. 12 by rotating the predetermined maneuver error turning direction assumed value $\sigma^r{}_{un}$ and the predetermined maneuver error course direction assumed value $\sigma^r{}_{up}$ on the basis of the course of the target and by propagating their rotated values by the maneuver detection time maneuver error propagation time interval $\Delta T$.

Figure 13:
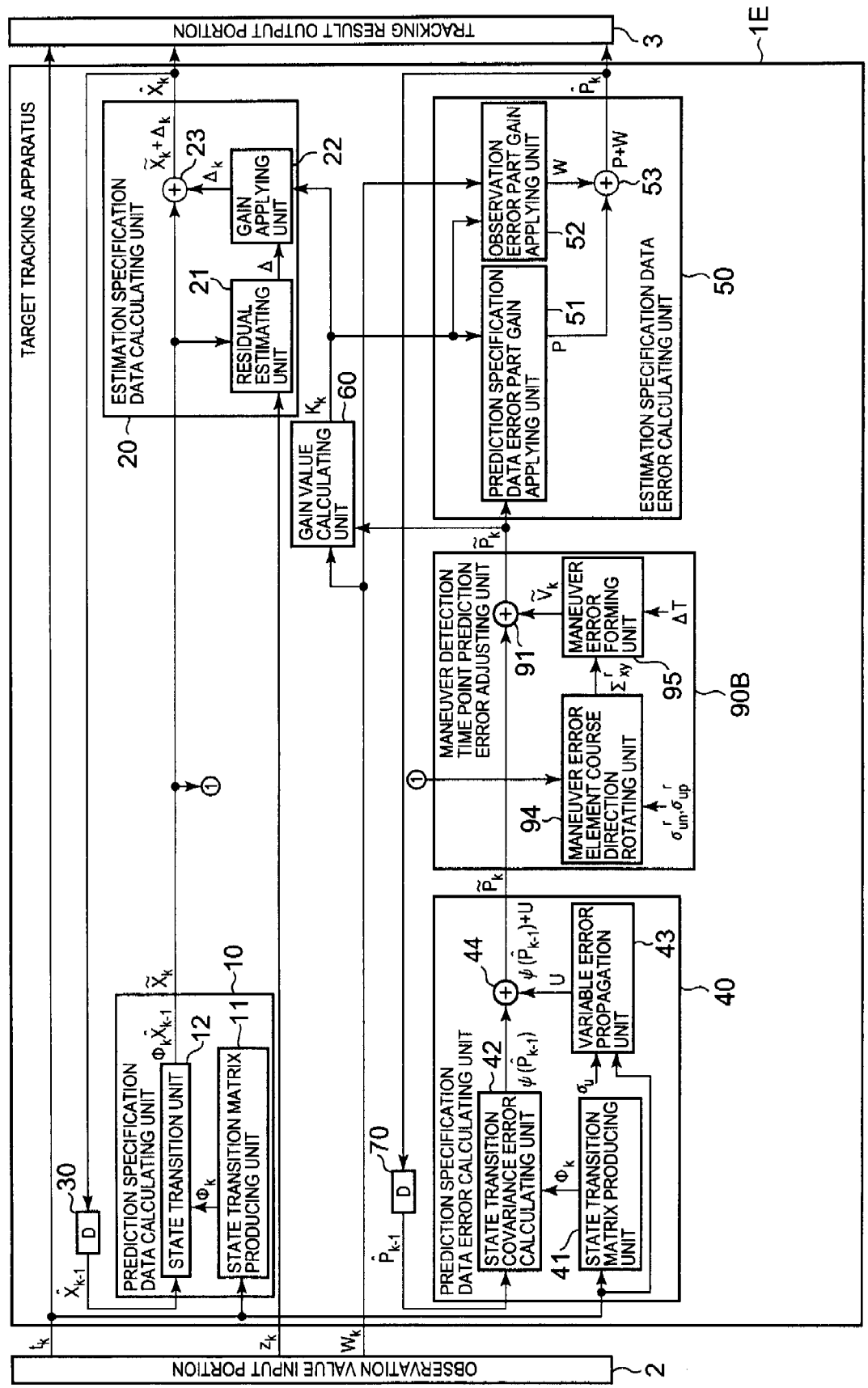
FIG. 13 is a block diagram of a target tracking apparatus according to a third embodiment of this invention.

FIG. 13 is a block diagram of a target tracking apparatus 1E according to a third embodiment of this invention where the maneuver detection time point prediction error adjusting unit is constructed in such a manner. The maneuver detection time point prediction error adjusting unit is depicted at 90B.

The maneuver detection time point prediction error adjusting unit 90B comprises the adder 91, a maneuver error element course direction rotating unit 94, and a maneuver error forming unit 95. The maneuver error element course direction rotating unit 94 is supplied with the maneuver error turning direction assumed value $\sigma^r{}_{un}$, the maneuver error course direction assumed value $\sigma^r{}_{up}$, and the current target specification data predicted value $\hat{X}_k$. The maneuver error element course direction rotating unit 94 calculates a maneuver error value (a maneuver error element) $\Sigma^r{}_{xy}$ obtained by rotating so as to adjust a vertical direction of an error range constructed by the maneuver error turning direction assumed value $\sigma^r{}_{un}$ and the maneuver error course direction assumed value $\sigma^r{}_{up}$ to a course of the current target specification data predicted value $\hat{X}_k$ in accordance with the following mathematical expression (24):

$$\Sigma_{xy}^r = \Gamma_2 \begin{pmatrix} \sigma_{un}^2 & 0 \\ 0 & \sigma_{up}^2 \end{pmatrix} \Gamma_2^T \qquad (24)$$

where $$\Gamma_2 = \begin{pmatrix} \cos\theta_v & \sin\theta_v \\ -\sin\theta_v & \cos\theta_v \end{pmatrix}$$

Herein, $$\theta_v = \tan^{-1}\left(\frac{\tilde{\dot{x}}_k}{\tilde{\dot{y}}_k}\right);$$

a course of the target, where $$(\tilde{x}_k \tilde{y}_k \tilde{\dot{x}}_k \tilde{\dot{y}}_k)^T = \tilde{X}_k$$

The maneuver error value (a maneuver error element) $\Sigma^r{}_{xy}$ and the maneuver detection time maneuver error propagation time interval $\Delta T$ are supplied to the maneuver error forming unit 95 which calculates a prediction error adjustment value $\tilde{V}_k$ in accordance with the following mathematical expression (25):

$$\tilde{V}_k = \Gamma_1 \Gamma_{xy}^r \Gamma_1^T \qquad (25)$$

where $$\Gamma_1 = \begin{pmatrix} \Delta T^2/2 & 0 \\ 0 & \Delta T^2/2 \\ \Delta T & 0 \\ 0 & \Delta T \end{pmatrix}$$

The target tracking apparatus 1E having such a structure can obtain effects similar to those of the target tracking apparatus 1D illustrated in FIG. 12.

In the prediction error adjustment value calculating method of the first exemplary aspect of this invention, the above-mentioned forming step may form the prediction error adjustment value by rotating a preliminary prepared maneuver error in the course direction of a predicted speed included in a target specification data predicted value. Alternatively, the above-mentioned forming step may include steps of calculating a maneuver error in response to a preliminarily prepared maneuver error turning direction assumed value, a preliminarily prepared maneuver error course direction assumed value, and a maneuver detection time maneuver error propagation time interval, and of rotating the calculated maneuver error in the course direction of a predicted speed included in a target specification data predicted value to calculate the prediction error adjustment value. In addition, the above-mentioned forming step may include the steps of calculating, in response to a preliminarily prepared maneuver error turning direction assumed value, a preliminarily prepared maneuver error course direction assumed value, and a target specification data predicted value, a maneuver error element which is turned to the course direction of a predicted speed included in the target specification data predicted value, and of calculating the prediction error adjustment value in response to the maneuver error element and a maneuver detection time maneuver error propagation time interval.

In the prediction error adjusting method of the second exemplary aspect of this invention, the above-mentioned forming step may form the prediction error adjustment value by rotating a preliminary prepared maneuver error in the course direction of a predicted speed included in the target specification data predicted value. Alternatively, the above-mentioned forming step may include the steps of calculating a maneuver error in response to a preliminarily prepared maneuver error turning direction assumed value, a preliminarily prepared maneuver error course direction assumed value, and a maneuver detection time maneuver error propagation time interval, and of rotating the calculated maneuver error in the course direction of a predicted speed included in a target specification data predicted value to calculate the prediction error adjustment value. In addition, the above-mentioned forming step may include the steps of calculating, in response to a preliminarily prepared maneuver error turning direction assumed value, a preliminarily prepared maneuver error course direction assumed value, and a target specification data predicted value, a maneuver error element which is turned to the course direction of a predicted speed included in the target specification data predicted value; and of calculating the prediction error adjustment value in response to the maneuver error element and a maneuver detection time maneuver error propagation time interval.

In the target tracking apparatus of the third exemplary aspect of this invention, the above-mentioned maneuver detection time point prediction error adjusting unit may include a maneuver error course direction rotating unit for calculating, on the basis of the current target specification data predicted value, the prediction error adjustment value obtained by rotating a preliminarily prepared maneuver error in the course direction of the predicted speed included in the current target specification data predicted value, and an adder for adding the prediction error adjustment value to the current target specification data predicted value to produce the renewed target specification data predicted value. Alternatively, the above-mentioned maneuver detection time point prediction error adjusting unit may include a maneuver error forming unit for calculating a maneuver error in response to a preliminarily prepared maneuver error turning direction assumed value, a preliminarily prepared maneuver error course direction assumed value, and a maneuver detection time maneuver error propagation time interval to produce a calculated maneuver error, a maneuver error course direction rotating unit for rotating, on the basis of the current target specification data predicted value, the calculated maneuver error in the course direction of the predicted speed included in the current target specification data predicted value to calculate the prediction error adjustment value, and an adder for adding the prediction error adjustment value to the current target specification data predicted value to produce the renewed target specification data predicted value. In addition, the above-mentioned maneuver detection time point prediction error adjusting unit may include a maneuver error element course direction rotating unit for calculating, in response to a preliminarily prepared maneuver error turning direction assumed value, a preliminarily prepared maneuver error course direction assumed value, and the current target specification data predicted value, a maneuver error element which is turned in the course direction of the predicted speed included in the current target specification data predicted value, a maneuver error forming unit for calculating the prediction error adjustment value in response to the maneuver error element and a maneuver detection time maneuver error propagation time interval, and an adder for adding the prediction error adjustment value to the current target specification data predicted value to produce the renewed target specification data predicted value.

In the target tracking method of the fourth exemplary aspect of this invention, the above-mentioned adjusting step may include the steps of calculating, on the basis of the current target specification data predicted value, the prediction error adjustment value obtained by rotating a preliminarily prepared maneuver error in the course direction of the predicted speed included in the current target specification data predicted value, and of adding the prediction error adjustment value to the current target specification data predicted value to produce the renewed target specification data predicted value. The above-mentioned adjusting step may include the steps of calculating a maneuver error in response to a preliminarily prepared maneuver error turning direction assumed value, a preliminarily prepared maneuver error course direction assumed value, and a maneuver detection time maneuver error propagation time interval, of rotating, on the basis of the current target specification data predicted value, the calculated maneuver error in the course direction of the predicted speed included in the current target specification data predicted value to calculate the prediction error adjustment value, and of adding the prediction error adjustment value to the current target specification data predicted value to produce the renewed target specification data predicted value. In addition, the above-mentioned adjusting step may includes the step of calculating, in response to a preliminarily prepared maneuver error turning direction assumed value, a preliminarily prepared maneuver error course direction assumed value, and said current target specification data predicted value, a maneuver error element which is turned in the course direction of the predicted speed included in the current target specification data predicted value, of calculating the prediction error adjustment value in response to the maneuver error element and a maneuver detection time maneuver error propagation time interval, and of adding the prediction error adjustment value to the current target specification data predicted value to produce the renewed target specification data predicted value.

While this invention has been particularly shown and described with reference to exemplary embodiments thereof, the invention is not limited to these embodiments. It will be understood by those of ordinary skill in the art that various changes in form and details may be therein without departing from the sprit and scope of the present invention as defined by the claims.

What is claimed is:

1. A method of calculating a prediction error adjustment value for adjusting a target specification data error predicted value on detecting that a target carries out a maneuver, said method comprising:
   deciding, using a processor, a type of the detected maneuver; and
   forming said prediction error adjustment value so as to make a turning direction of said target large and to make a course direction of said target small when it is decided that said detected maneuver is turning around with constant velocity, and forming said prediction error adjustment value so as to make the course direction of said target large and to make the turning direction of said target small when it is decided that said detected maneuver is traveling in a straight line with acceleration/deceleration.

2. The method as claimed in claim 1, wherein said forming forms said prediction error adjustment value by rotating a preliminary prepared maneuver error in the course direction of a predicted speed included in a target specification data predicted value.

3. The method as claimed in claim 1, wherein said forming comprises:
  calculating a maneuver error in response to a preliminarily prepared maneuver error turning direction assumed value, a preliminarily prepared maneuver error course direction assumed value, and a maneuver detection time maneuver error propagation time interval;
  rotating said calculated maneuver error in the course direction of a predicted speed included in a target specification data predicted value to calculate said prediction error adjustment value.

4. The method as claimed in claim 1, wherein said forming comprises:
  calculating, in response to a preliminarily prepared maneuver error turning direction assumed value, a preliminarily prepared maneuver error course direction assumed value, and a target specification data predicted value, a maneuver error element which is turned to the course direction of a predicted speed included in said target specification data predicted value; and
  calculating said prediction error adjustment value in response to said maneuver error element and a maneuver detection time maneuver error propagation time interval.

5. The method of claim 1, further comprising:
  receiving, prior to the deciding the type of the detected maneuver, at least two measured position values of the target and respective time points at which the measured position values are measured; and
  detecting a direction in which the target maneuvers based on the received measured position values and the respective time points,
  wherein the deciding the type of the detected maneuver comprises deciding the type of the detected maneuver based on the detected direction in which the target maneuvers.

6. A method of adjusting a target specification data error predicted value on detecting that a target carries out a maneuver, said method comprises:
  deciding, using a processor, a type of said detected maneuver;
  forming a prediction error adjustment value so as to make a turning direction of said target large and to make a course direction of said target small when it is decided that said detected maneuver is turning around with constant velocity, and forming said prediction error adjustment value so as to make the course direction of said target large and to make the turning direction of said target small when it is decided that said detected maneuver is traveling in a straight line with acceleration/deceleration; and
  adding said prediction error adjustment value to said target specification data error predicted value to calculate a renewed target specification data error predicted value.

7. The method as claimed in claim 6, wherein said forming forms said prediction error adjustment value by rotating a preliminary prepared maneuver error in the course direction of a predicted speed included in the target specification data predicted value.

8. The method as claimed in claim 6, wherein said forming comprises:
  calculating a maneuver error in response to a preliminarily prepared maneuver error turning direction assumed value, a preliminarily prepared maneuver error course direction assumed value, and a maneuver detection time maneuver error propagation time interval;
  rotating said calculated maneuver error in the course direction of a predicted speed included in the target specification data predicted value to calculate said prediction error adjustment value.

9. The method as claimed in claim 6, wherein said forming comprises:
  calculating, in response to a preliminarily prepared maneuver error turning direction assumed value, a preliminarily prepared maneuver error course direction assumed value, and a target specification data predicted value, a maneuver error element which is turned to the course direction of a predicted speed included in said target specification data predicted value; and
  calculating said prediction error adjustment value in response to said maneuver error element and a maneuver detection time maneuver error propagation time interval.

10. The method of claim 6, further comprising:
  receiving, prior to the deciding the type of the detected maneuver, at least two measured position values of the target and respective time points at which the measured position values are measured; and
  detecting a direction in which the target maneuvers based on the received measured position values and the respective time points,
  wherein the deciding the type of the detected maneuver comprises deciding the type of the detected maneuver based on the detected direction in which the target maneuvers.

11. A target tracking apparatus which is supplied with an observed value of a target, an observed value error, and a time instant of said observed value and which produces a current target specification data estimated value and a current target specification data error estimated value, wherein said target tracking apparatus comprises:
  a prediction specification data calculating unit for calculating, in response to the time instant of said observed value and a previous target specification data estimated value, a current target specification data predicted value corresponding to the time instant of said observed value;
  a prediction specification data error calculating unit for calculating, in response to the time instant of said observed value and a previous target specification data error estimated value, a current target specification data error predicted value corresponding to the time instant of said observed value;
  a gain value calculating unit for calculating a gain value in response to said observed value error and said current target specification data error predicted value;
  an estimation specification data calculating unit for calculating said current target specification data estimated value in response to said current target specification data predicted value, said observed value, and said gain value;
  an estimation specification data error calculating unit for calculating said current target specification data error estimated value in response to said current target specification data error predicted value, said observed value error, and said gain value; and
  a maneuver detection time point prediction error adjusting unit, disposed between said prediction specification data error calculating unit and said estimation specification data calculating unit and said gain value calculating unit, for operating at only a time point when it is detected that said target makes the maneuver, said maneuver detection time point prediction error adjusting unit calculating, in response to said current target specification data predicted value, a prediction error adjustment value obtained by rotating, on the basis of said current target specification data predicted value, a maneuver error in a course direction of a predicted speed included in said current target specification data predicted value, said maneuver detection time point prediction error adjusting unit supplying said estimation specification data error calculating unit and said gain value calculating unit with a renewed target specification data error predicted value obtained by adding said prediction error adjustment value to said current target specification data error predicted value in lieu of said current target specification data error predicted value.

12. The target tracking apparatus as claimed in claim 11, wherein said maneuver detection time point prediction error adjusting unit comprises:
   a maneuver error course direction rotating unit for calculating, on the basis of said current target specification data predicted value, said prediction error adjustment value obtained by rotating a preliminarily prepared maneuver error in the course direction of the predicted speed included in said current target specification data predicted value; and
   an adder for adding said prediction error adjustment value to said current target specification data error predicted value to produce said renewed target specification data error predicted value.

13. The target tracking apparatus as claimed in claim 11, wherein said maneuver detection time point prediction error adjusting unit comprises:
   a maneuver error forming unit for calculating a maneuver error in response to a preliminarily prepared maneuver error turning direction assumed value, a preliminarily prepared maneuver error course direction assumed value, and a maneuver detection time maneuver error propagation time interval to produce a calculated maneuver error;
   a maneuver error course direction rotating unit for rotating, on the basis of said current target specification data predicted value, said calculated maneuver error in the course direction of the predicted speed included in said current target specification data predicted value to calculate said prediction error adjustment value; and
   an adder for adding said prediction error adjustment value to said current target specification data error predicted value to produce said renewed target specification data error predicted value.

14. The target tracking apparatus as claimed in claim 11, wherein said maneuver detection time point prediction error adjusting unit comprises:
   a maneuver error element course direction rotating unit for calculating, in response to a preliminarily prepared maneuver error turning direction assumed value, a preliminarily prepared maneuver error course direction assumed value, and said current target specification data predicted value, a maneuver error element which is turned in the course direction of the predicted speed included in said current target specification data predicted value;
   a maneuver error forming unit for calculating said prediction error adjustment value in response to said maneuver error element and a maneuver detection time maneuver error propagation time interval; and
   an adder for adding said prediction error adjustment value to said current target specification data error predicted value to produce said renewed target specification data error predicted value.

15. A target tracking method for estimating, from an observed value which is obtained by observing a position of a target, specification data of a position and a speed of said target, wherein said target tracking method comprises:
   calculating, in response to a time instant of said observed value and a previous target specification data estimated value, a current target specification data predicted value corresponding to the time instant of said observed value;
   calculating, in response to the time instant of said observed value and a previous target specification data error estimated value, a current target specification data error predicted value corresponding to the time instant of said observed value;
   calculating, using a processor, a gain value in response to an observed value error and said current target specification data error predicted value;
   calculating a current target specification data estimated value in response to said current target specification data predicted value, said observed value, and said gain value;
   calculating a current target specification data error estimated value in response to said current target specification data error predicted value, said observed value error, and said gain value; and
   adjusting a prediction error at only a time point when it is detected that said target makes the maneuver, wherein
   said adjusting step calculates, in response to said current target specification data predicted value, a prediction error adjustment value obtained by rotating, on the basis of said current target specification data predicted value, a maneuver error in a course direction of a predicted speed included in said current target specification data predicted value, said adjusting step producing a renewed target specification data error predicted value obtained by adding said prediction error adjustment value to said current target specification data error predicted value.

16. The target tracking method as claimed in claim 15, wherein said adjusting step comprises:
   calculating, on the basis of said current target specification data predicted value, said prediction error adjustment value obtained by rotating a preliminarily prepared maneuver error in the course direction of the predicted speed included in said current target specification data predicted value; and
   adding said prediction error adjustment value to said current target specification data error predicted value to produce said renewed target specification data error predicted value.

17. The target tracking method as claimed in claim 15, wherein said adjusting step comprises:
   calculating a maneuver error in response to a preliminarily prepared maneuver error turning direction assumed value, a preliminarily prepared maneuver error course direction assumed value, and a maneuver detection time maneuver error propagation time interval;
   rotating, on the basis of said current target specification data predicted value, said calculated maneuver error in the course direction of the predicted speed included in said current target specification data predicted value to calculate said prediction error adjustment value; and
   adding said prediction error adjustment value to said current target specification data error predicted value to produce said renewed target specification data error predicted value.

18. The target tracking method as claimed in claim 15, wherein said adjusting step comprises:

calculating, in response to a preliminarily prepared maneuver error turning direction assumed value, a preliminarily prepared maneuver error course direction assumed value, and said current target specification data predicted value, a maneuver error element which is turned in the course direction of the predicted speed included in said current target specification data predicted value;

calculating said prediction error adjustment value in response to said maneuver error element and a maneuver detection time maneuver error propagation time interval; and adding said prediction error adjustment value to said current target specification data error predicted value to produce said renewed target specification data error predicted value.

\* \* \* \* \*